(No Model.) 4 Sheets—Sheet 1.
A. B. GREIG.
APPARATUS FOR CONSTRUCTING PAVING BLOCKS.
No. 591,757. Patented Oct. 12, 1897.
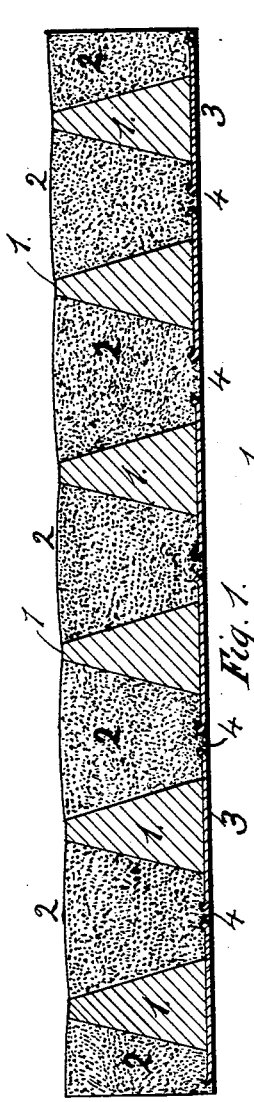
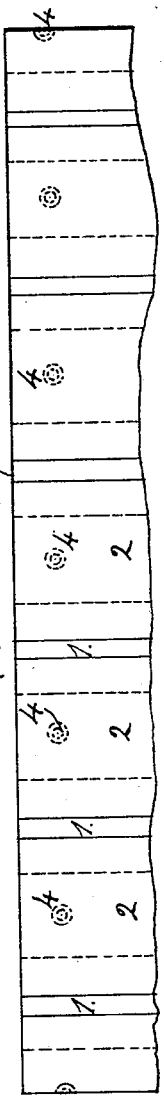
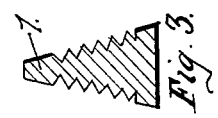
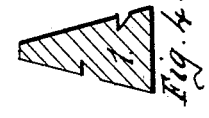
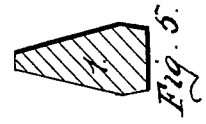
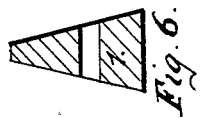
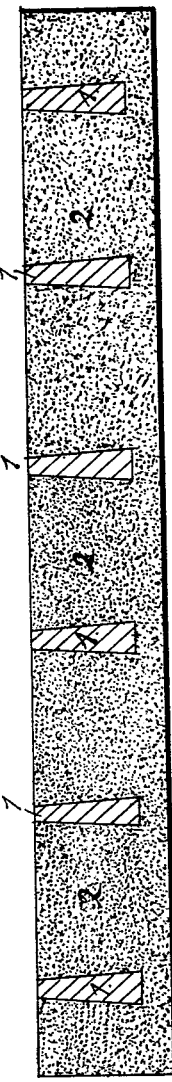
Witnesses
Fred H Davis
George H Sonneborn
Inventor
Alfred Burness Greig
by James G. Lorrain
Atty
THE NORRIS PETERS CO., PHOTO-LITHO., WASHINGTON, D. C.

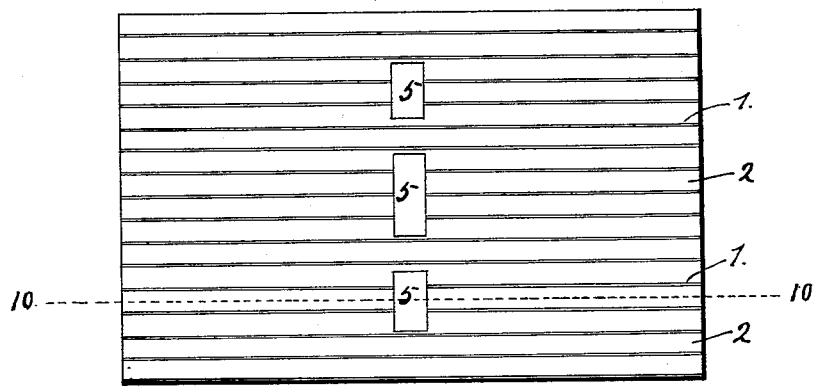
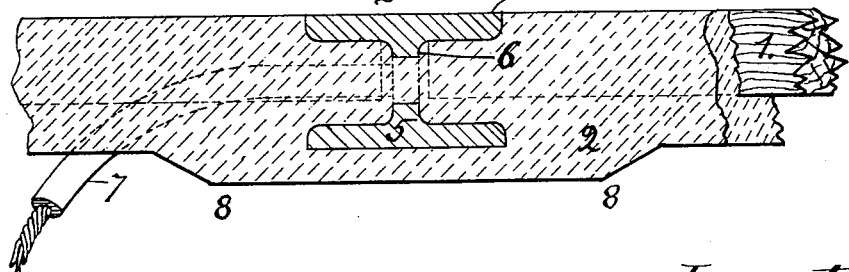

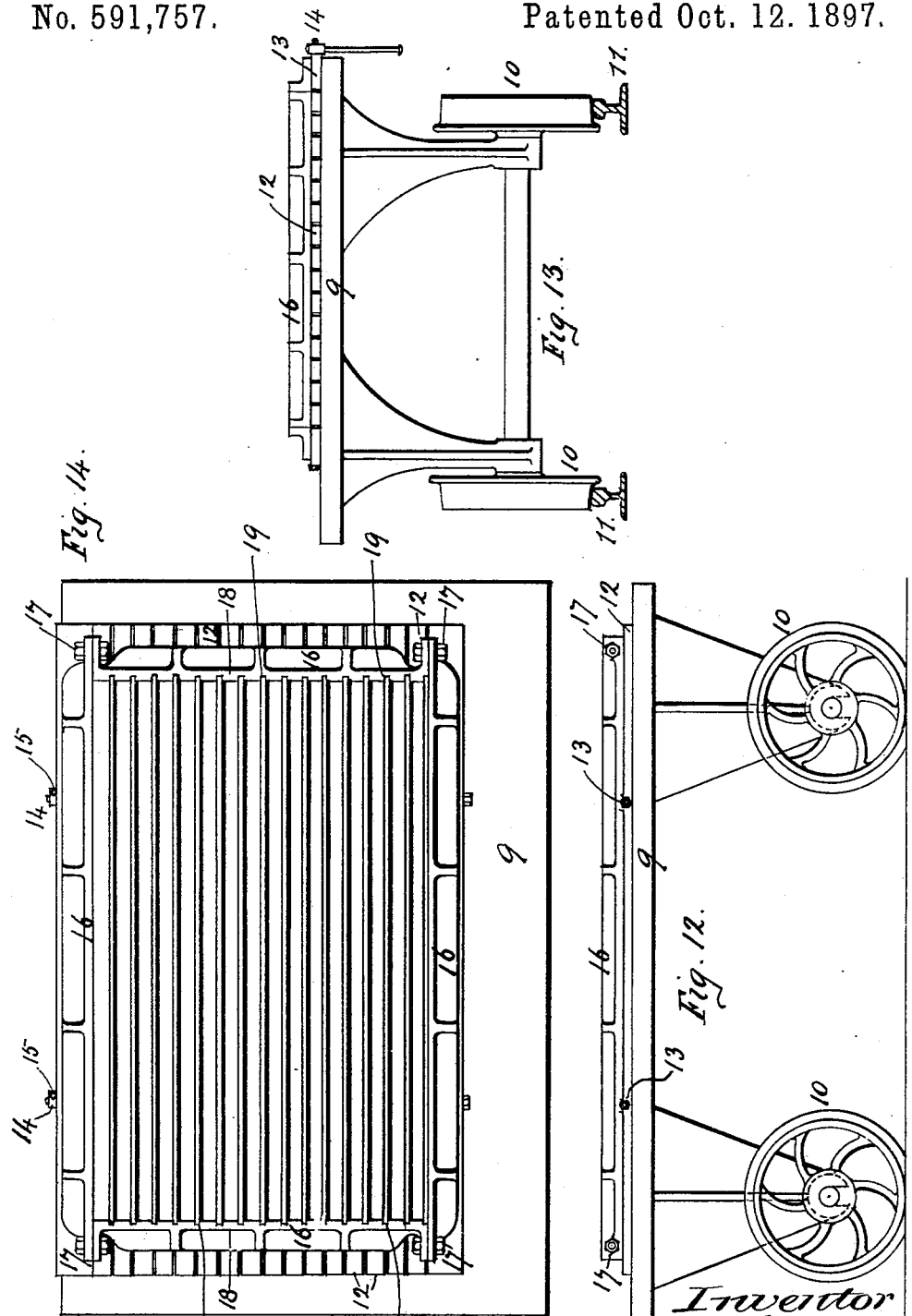

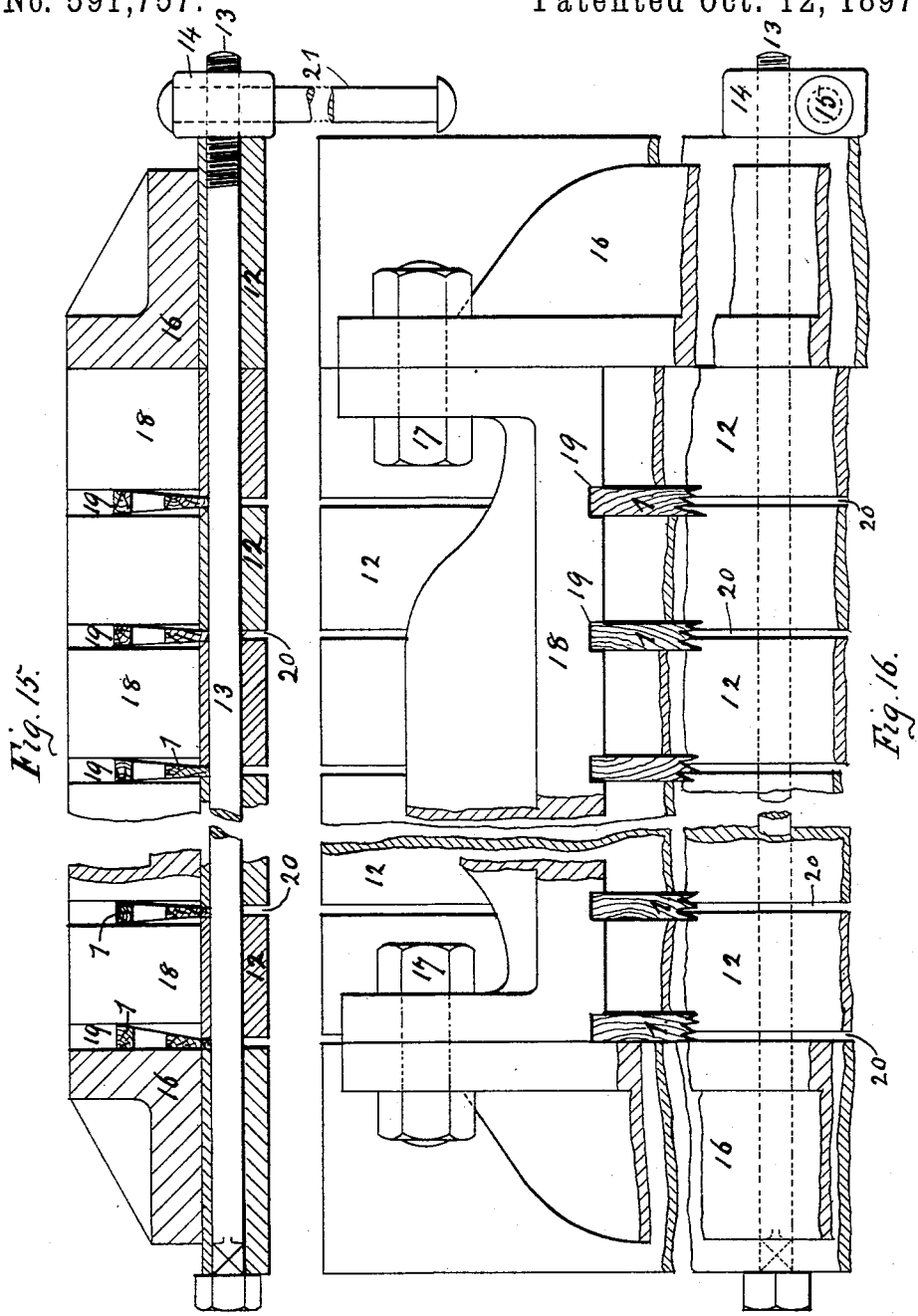

UNITED STATES PATENT OFFICE.

ALFRED BURNESS GREIG, OF LONDON, ENGLAND.

APPARATUS FOR CONSTRUCTING PAVING-BLOCKS.

SPECIFICATION forming part of Letters Patent No. 591,757, dated October 12, 1897.

Application filed January 6, 1897. Serial No. 618,128. (No model.) Patented in England November 15, 1895, No. 21,753.

*To all whom it may concern:*

Be it known that I, ALFRED BURNESS GREIG, consulting engineer, a subject of the Queen of Great Britain, and a resident of London, in the county of Middlesex, England, have invented certain new and useful Improvements in and Apparatus for the Construction of Pavements and Paving-Blocks for Roads, Floors, Roofs, and the Like, (for which I have obtained a patent of Great Britain, No. 21,735, dated November 15, 1895,) of which the following is a specification.

This invention relates to improvements in and apparatus for the construction of pavements and paving-blocks for roads, floors, roofs, and the like, by means of which certain advantages are obtained.

According to my invention the paving-blocks are composed of a number of strips or bars of wood or the like arranged at suitable intervals apart with asphalt, asphaltic concrete or composition, concrete, or other suitable substances which are plastic to the extent of possible yielding or creeping under traffic between them. The asphalt or other substance employed binds the parts together into a solid block, which can be made of any convenient dimensions. The said strips or bars are preferably of triangular or approximately triangular shape in cross-section and of a depth approximately equal to or somewhat less than the thickness of the paving-block of which they form a part. Where blocks of additional strength are required, I may provide them with a base or sole plate which forms an integral part of the blocks, as hereinafter explained.

My invention further consists of apparatus for the manufacture of the said blocks.

In order that my said invention may be readily understood, I shall proceed to describe it with reference to the accompanying drawings, in which—

Figure 1 is a vertical section, and Fig. 2 a part plan view of a paving-block constructed in accordance with my invention and of a form well adapted for ordinary roads. Figs. 3 to 6 show in cross-section various forms of strip or bar of somewhat different shape from those shown in Fig. 1. Fig. 7 is a vertical section showing a slightly-modified construction of the paving-block illustrated in Fig. 1. Fig. 8 is a plan view of a form of block constructed under my invention and constituting what I for the purpose of this specification term an "electric traction-block." Fig. 9 is an end view of the same, but with a sole-plate, which I may sometimes employ, attached thereto, shown in the inverted position in which it is molded. Fig. 10 is a section. Fig. 11 is an enlarged view of a part of Fig. 10, showing certain parts broken away. Fig. 12 is a side elevation of what I term, for the purposes of this specification, a "truck-table," employed for the purpose of constructing the blocks. Fig. 13 is an end elevation thereof. Fig. 14 is a plan thereof. Fig. 15 shows in longitudinal section a portion of the upper part of a truck-table with the strips in position. Fig. 16 is a part plan of the same.

In the figures similar numerals of reference indicate similar or equivalent parts.

Referring now to Figs. 1 to 6, 1 1 are the strips of wood or the like, 2 is the asphalt or other filling, and 3 is the sole-plate. The sides of the aforesaid strips 1 may be plain, as shown in Fig. 1, but I sometimes find it convenient to so form their sides that they will assist in binding the asphalt to the strips. For example, in some cases I provide them with serrations, as shown in Fig. 3, or with notches, as in Fig. 4, or with the corners at their bases cut away, as in Fig. 5. In other cases I form transverse apertures through them, as shown in Fig. 6, so that the asphalt or other substance employed can pass from one side to the other of the strips and thereby act to rivet the strips in place. The sole-plate 3 is, in the example shown, composed of sheet metal, and is provided at intervals between the strips 1 with holes 4, produced by punching. I find it advantageous to employ a comparatively blunt instrument for punching these holes, so that they will be of crater form, as shown in Fig. 1. The asphalt or other filling entering these holes firmly keys the sole-plate to the block.

In Fig. 7 I have illustrated a paving-block in which the filling extends underneath the strips and takes the place of the sole-plate 3. If desired, the upper portion or surface or filling may consist of india-rubber composition or other material that will deaden the sound produced by the traffic passing over the blocks when they are laid on a roadway. The upper surface of the filling may likewise be roughened or otherwise formed, so that a good foothold may be obtained.

In Fig. 8, which represents a paving-block designed for use on a street electric railway operated under what is known as the "surface-contact system," 5 5 5 are the surface-contact points or sections with which contact is made by the collectors of the cars. The said surface-contact points are more clearly shown in Figs. 10 and 11, where they are seen in cross-section. They consist of iron blocks (hereinafter termed "contact-blocks") of H or double-T section, so placed within the paving-blocks that their upper surfaces are flush with the upper surfaces of the said paving-blocks. Through orifices punched or bored through the webs 6 of the said contact-blocks the ends of the section-leads 7 pass, the said ends being bonded to the said webs in any convenient manner. Additional orifices may be made in the webs or other parts of the contact-blocks in order that the asphalt or other composition may flow through same and serve to retain the said contact-blocks in position, as in the case of the strip shown in Fig. 6. When the contact-blocks are deeper than paving-blocks of normal thickness, the latter are formed of increased thickness at the part 8. (Shown in Figs. 10 and 11.) Fig. 11 also illustrates the manner in which the strips are shortened or cut away for the reception of the contact-blocks.

Figs. 12, 13, and 14 illustrate in side elevation, end elevation, and plan, respectively, what I have hereinbefore termed a "truck-table" and which I employ for the manufacture of my paving-blocks. The truck-table consists of a plain slab 9, preferably mounted on wheels 10 10, so as to be capable of traversing a line of rails 11 11 in the factory. On this table are placed a number of flat bars 12 12, through which two or more holes are bored and through which holes pass the long bolts 13. On the screwed ends of the said bolts are the nuts 14, having tommie-holes or the like 15 to enable the said nuts to be turned. To prevent the bolts from turning, their other ends are squared, flattened, or the like. Above the said flat bars 12 I place a metal frame consisting of four separate sides 16, whose dimensions vary with those of the block under construction. The sides of the said frame are connected at the four corners by the bolts and nuts 17. By having a number of holes on the longer sides of the said frame the length of the blocks may be varied while using the same frame. The end sides 18 of the said frame have vertical grooves 19 coinciding with the spaces between the flat bars 12.

In Figs. 15 and 16, which show on an enlarged scale and in cross-section and plan, respectively, certain parts illustrated in Figs. 13 and 14, I show how the strips or bars 1 are placed in position before the asphalt or other filling material is poured in for the purpose of making a block. For such purpose I mold the block with the wearing-face downward. The frame and bars being on the slab 9, as indicated, and the strips or laths being cut to the proper length and shape these latter are dropped into the grooves 20 which lie between the flat bars 12 and coincide with the vertical grooves 19 with their wearing or narrow edges downward. While in this position the said narrow edges rest upon the long bolts 13. The said bolts are then tightened up by turning the tommies 21, so that the narrow edges of the strips or laths are now retained between the flat bars 12. The said strips or laths are now firmly held in the vertical position and parallel to one another. The truck-table is now run to the vessel containing asphalt or other filling material, which is caused to flow over and between and through the orifices of the said strips or laths. When the said composition has solidified, the block is formed, and all that remains to be done is to loosen the bolts 13 and 17, remove the block therefrom, reverse its position, and plane down the narrow edges of the strips or laths until the latter are flush or nearly flush with the wearing-surface of the block—that is to say, with the surface of the composition or filling material. When contact-blocks have to be inserted, the strips or laths 1 are necessarily shortened. The contact-blocks are laid in proper position on the slab 9, and the strips or laths are cut away, as shown at 22, (see Fig. 11,) and placed in position before the composition or filling material is poured in. If the contact-block be of greater depth than an ordinary paving-block, an extra thickness of composition is run over it, as shown at 8, Fig. 11.

By means of my invention I am able to construct my paving-blocks at any convenient place and transmit them to the spot where they are to be laid. Such blocks distribute the weight of the traffic or load in a very efficient manner and enable a roadway or the like to be maintained of very even surface.

The function of the strips is twofold: First, the strips being set on edge and substantially dividing the asphaltic composition, they prevent the creeping or flow of the asphalt transversely to the strips; secondly, in extending substantially flush with the upper surface the strips, even if covered with a very thin layer of the asphalt, afford a grip for the feet of animals, and in my preferred construction the strips are exposed at the surface in lines transverse to the traffic, which lines are very narrow relative to the areas of asphalt. As a result of this, in warm dry weather when the asphalt swells the wood contracts and draws back into the asphalt, but in rain or dampness the wood swells and projects slightly, preventing slipping and giving firm foothold.

I am aware that it has been proposed to lay dividing-pieces of wood in the road-bed with cement blocks between them, the blocks being quite separate from each other and from the dividing-pieces, forming a pavement of utterly different character, in which there is no attempt to connect the cement-blocks beneath the dividing-pieces. I am also aware that it has been proposed to fill in dovetailed grooves in a cement surface with wooden strips laid flat and each exposing one of the broad faces of the wood, without, however, extending the strips even half-way down into the layer of cement. Such strips would not only be useless but objectionable in my pavement, and they do not fulfil either of the functions of my strips set up on edge, dividing the asphalt, and appearing at the surface only as lines or narrow faces.

In some cases I find it desirable to construct my paving-blocks with a slightly-curved wearing-surface. When such is the case, I make transverse saw-cuts, say of the depth of half an inch or so, on the broader edge of the strips or laths and I mold the blocks upon a slab of concave surface or upon flat bars of varying thickness so as to present a curved convex surface to the blocks molded thereon.

Having thus described my invention, what I claim as new, and desire to secure by Letters Patent, is—

1. A paving-block consisting of a body of plastic material 2, and strips 1 embedded therein on edge, the said strips being larger at the bottom and exposing a narrow wearing edge at the upper surface of the block, and the said plastic material forming one continuous mass beneath the said strips, substantially as set forth.

2. A paving-block consisting of a body of plastic material 2 and perforated strips 1 embedded therein on edge, the said strips being larger at the bottom and exposing a narrow wearing-face at the upper surface of the block, and the said plastic material forming one continuous mass extending beneath the said strips and extending through the perforations in the said strips, substantially as set forth.

3. The improved pavement comprising a body of asphaltic composition or other plastic material, and wooden strips embedded in the wearing-surface of the said pavement, on edge, and of larger cross-section toward their lower portion, the said strips extending down nearly through the said asphaltic concrete or other plastic material and the said material extending beneath the said strips, substantially as set forth.

4. A paving-block consisting of a body of plastic material 2 and strips 1 embedded therein on edge, the said strips 1 exposing narrow wearing-faces between broad faces of the said plastic material at the upper surface of the block and extending nearly through the layer or body of said plastic material 2, substantially as set forth.

5. A wearing-facing for pavements consisting of a layer or body of plastic material and a series of narrow strips set on edge in the said plastic material and dividing it substantially from the surface nearly to the base of the said layer or body, substantially as set forth.

6. A paving-block consisting of a body of plastic material 2 and strips 1 embedded therein on edge, the said strips being of a substance which expands when moist and contracts when dry, and the said plastic material being of a nature which is less expansible than the said strips when exposed to dampness and cold and relatively more expansible when exposed to dryness and heat, the upper surface of the said strips being above or below the surface of the neighboring plastic material 2 when the said strips are respectively moist and dry, substantially as set forth.

7. A pavement having a wearing-facing which consists of plastic material 2 and embedded strips 1, the said strips being of wood and the said plastic material being an asphaltic or similar composition, and the said strips being loosely placed on edge, extending down into and nearly dividing the said plastic material but locked therein, substantially as set forth.

8. A pavement having a wearing-facing which consists of plastic material 2 and embedded strips 1, the said strips being of wood, parallel with and isolated from each other, and extending downward in the said plastic material a distance less than the thickness of the said plastic material and interlocked therein, the said plastic material extending beneath adjacent strips in a continuous mass, substantially as set forth.

9. In the apparatus for casting paving-blocks, the frame 16 consisting of detachable parts, a base consisting of a plurality of adjustable bars, and means for drawing the said bars together to embrace and hold a plurality of strips, substantially as set forth.

10. In combination in an apparatus or mold for casting paving-blocks, the plurality of bars 12, means for drawing the said bars together, and a lateral confining frame or mold 16 resting upon the said bars, substantially as set forth.

11. In combination in an apparatus or mold for casting paving-blocks, the plurality of bars 12 arranged parallel with each other, leaving intervals between the several bars, a frame superposed upon the said bars, and means for drawing the said bars together to lessen the interval between the several bars, substantially as and for the purposes set forth.

12. In combination in an apparatus or mold for casting paving-blocks, the plurality of bars 12 arranged parallel with each other, leaving intervals between the several bars, a frame superposed upon the said bars, and means for drawing the said bars together, the said frame being provided with grooves running vertically and registering with the said intervals between the said bars, whereby strips may be secured in the said intervals and the said grooves, substantially as and for the purposes set forth.

In testimony whereof I have hereunto set my hand, this 28th day of October, 1896, in the presence of the two subscribing witnesses.

ALFRED BURNESS GREIG.

Witnesses:
FREDERICK C. HARRIS,
THOMAS J. OSMAN.